(12) United States Patent
Inouchi et al.

(10) Patent No.: US 8,159,989 B2
(45) Date of Patent: Apr. 17, 2012

(54) RELAY NETWORK SYSTEM AND TERMINAL ADAPTOR APPARATUS

(75) Inventors: Hidenori Inouchi, Yokohama (JP); Katsumi Konishi, Yokohama (JP); Koh Ohnishi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 609 days.

(21) Appl. No.: 12/303,424

(22) PCT Filed: Jun. 5, 2006

(86) PCT No.: PCT/JP2006/311222
§ 371 (c)(1),
(2), (4) Date: Jun. 17, 2009

(87) PCT Pub. No.: WO2007/141840
PCT Pub. Date: Dec. 13, 2007

(65) Prior Publication Data
US 2010/0020738 A1 Jan. 28, 2010

(51) Int. Cl.
*H04B 7/14* (2006.01)
*H04J 1/10* (2006.01)
*H04J 3/08* (2006.01)
(52) U.S. Cl. .................................. 370/315
(58) Field of Classification Search ............. 370/315
See application file for complete search history.

(56) References Cited

U.S. PATENT DOCUMENTS

| 7,350,077 | B2* | 3/2008 | Meier et al. ............. 713/171 |
| 7,430,205 | B2* | 9/2008 | Ota et al. ............. 370/393 |
| 7,792,133 | B2* | 9/2010 | Kamiya ............. 370/422 |
| 2002/0143955 | A1* | 10/2002 | Shimada et al. ............. 709/227 |
| 2003/0037163 | A1* | 2/2003 | Kitada et al. ............. 709/236 |
| 2004/0105420 | A1* | 6/2004 | Takeda et al. ............. 370/349 |
| 2005/0180429 | A1* | 8/2005 | Ghahremani et al. ... 370/395.21 |
| 2006/0274744 | A1* | 12/2006 | Nagai et al. ............. 370/389 |
| 2009/0172170 | A1* | 7/2009 | Rey ............. 709/227 |

FOREIGN PATENT DOCUMENTS

| JP | 11-112570 | 4/1999 |
| JP | 2001-285354 | 10/2001 |
| JP | 2005-142702 | 6/2005 |
| JP | 2005-252762 | 9/2005 |
| WO | WO 2005/114920 | 12/2005 |

OTHER PUBLICATIONS

European Search Report in European Patent Application No. 06756973.1-2416/2031803 mailed Mar. 1, 2011.

(Continued)

*Primary Examiner* — Kenny Lin
(74) *Attorney, Agent, or Firm* — Brundidge & Stanger, P.C.

(57) ABSTRACT

The optimum relay route is selected out of a plurality of relay routes to a server. In order to solve a multirouting problem, introduced is a multi routing system for determining a relay route on the basis of a label corresponding to a terminal of an access source and a server type of an access destination instead of using an IP address as a key to select the relay route. A VPN using L2TP is also introduced. A CE router A (101) maps MAC addresses of terminals (103, 104) that it accommodates on the L2TP-VPN session. The session ID of the L2TP is used as the session ID of VPN, which is used as the key to select a relay route.

14 Claims, 17 Drawing Sheets

OTHER PUBLICATIONS

Editors et al., "Working Draft of Rec. FMC-IMS: Fixed Mobile Convergence with a common IMS Session control domain; TD 118", ITU-T Draft Study Period 2005-2008, International Telecommunication Union, Geneva, CH, vol. Study Group 13, Jan. 6, 2009, pp. 1-29, XP017409932.

Alcatel, BT PLC. et al., UMA Architecture (Stage 2), Unlicensed Mobile Access (UMA) Architecture (Stage 2), 2004-2005, pp. 2-87. (esp. Sections 6.1.4 and Fig. 6.1.4.1).

UMAtoday, "UMA Technology", 2008, umatoday.com.

UNIX Magazine, (vol. 7 (2004)) pp. 30-53.

UNIX Magazine, (vol. 8 (2004)) pp. 36-57.

W. Townsley et al, Network Working Group, "Layer Two Tunneling Protocol 'L2TP'",RFC 2661. http://www.rfc-editor.org/rfc/rfc2661.txt, Aug. 21, 2009, pp. 1-63.

J. Lau, Ed., et al., Network Working Group, "Layer Two Tunneling Protocol—Version 3 (L2TPv3)", RFC 3931. http://www.rfc-editor.org/rfc/rfc3931.txt, Aug. 21, 2009, pp. 1-74.

* cited by examiner

SESSION MANAGEMENT TABLE IN CE ROUTER

SESSION MANAGEMENT TABLE IN L2TP SERVER                    413

| SOURCE MAC ADDRESS | DESTINATION SERVER DOMAIN NAME | DESTINATION SERVER IP ADDRESS | VLAN ID | SESSION ID | |
|---|---|---|---|---|---|
| FIXED TERMINAL 1 (80:00:00:0:00:01) | hs1.fixed.com | 192.168.1.11 | 1001 | 1 | ① F-F |
| FIXED TERMINAL 2 (80:00:00:0:00:02) | hs1.mobile.com | 192.168.1.21 | 1002 | 2 | ② F-M |
| MOBILE TERMINAL 1 (80:00:00:0:10:01) | hs1.mobile.com | 192.168.1.21 | 1002 | 3 | ③ M-M |
| MOBILE TERMINAL 2 (80:00:00:0:10:02) | hs1.fixed.com | 192.168.1.11 | 1001 | 4 | ④ M-F |
| ... | ... | ... | ... | ... | |
|  |  |  |  |  | |

FIG.7

SERVER TYPE AVP

| M | H | Reserve | Length | 0 | Extended VenderID AVP Header |
|---|---|---------|--------|---|---|
| 58 | | | | Vendor ID | |
| Vendor ID | | | | Attribute type (XX) | Server type AVP |
| Server type. 1 = SERVER F  Server type. 2 = SERVER M | | | | | |

(a)

SERVER ADDRESS AVP

| M | H | Reserve | Length | 0 | Extended VenderID AVP Header |
|---|---|---------|--------|---|---|
| 58 | | | | Vendor ID | |
| Vendor ID | | | | Attribute type (XX) | Server IP Address AVP |
| Server IP Address | | | | | |

SESSION MANAGEMENT TABLE IN CE ROUTER (WITHOUT L2TP SERVER) 1313

| SOURCE MAC ADDRESS | DESTINATION SERVER IP ADDRESS | RELAY PATH PW TYPE | ROUTING TABLE ID | |
|---|---|---|---|---|
| FIXED TERMINAL 1 (80:00:00:0:00:01) | 192.168.1.11 | PPP | 1 | ① |
| MOBILE TERMINAL 1 (80:00:00:0:10:01) | 192.168.1.21 | Ether | 2 | ② |
| FIXED TERMINAL 2 (80:00:00:0:00:02) | 192.168.1.11 | PPP | 3 | ③ |
| MOBILE TERMINAL 2 (80:00:00:0:10:02) | 192.168.1.21 | PPP | 4 | ④ |
| ... | ... | ... | ... | ... |
| | | | | |

FIG.16

RELAY NETWORK SYSTEM AND TERMINAL ADAPTOR APPARATUS

FIELD OF THE INVENTION

The present invention relates to relay network systems and terminal adaptor apparatuses, and more particularly, to an FMC (fixed mobile convergence) relay network system in which a network service for fixed terminals and a network service for mobile terminals are formed by a plurality of relay networks by using Internet Protocol, and to a terminal adaptor apparatus.

BACKGROUND OF THE INVENTION

As a system for implementing an FMC service by using Internet Protocol (IP), a UMA (unlicensed mobile access) system has been used as a standard. In the UMA standard, an Internet connection service is provided in which a portable terminal is connected to a home AP (access point) to use a broadband network, and a portable terminal serving as a non-IP terminal is connected through an IPsecGW apparatus called a UNC (unlicensed network controller) when the FMC service is provided in which a VPN (virtual private network) service is provided. The UMA system performs the following processing, for example, to accommodate a portable terminal not conforming to IP in an IP access network.

A portable terminal conforming to a UMA standard capsulates an existing communication protocol for portable telephones by IPsec Protocol (IP Security Protocol) and sends it to a GW (gateway) apparatus called the UNC. The UNC terminates IPsec Protocol to take out the portable-telephone protocol which has been capsulated and connects it to an existing portable telephone network based on the telephone routing. By using IPsec Protocol, an Internet connection service can be provided while the same level of security as with usual portable telephones is provided even through the Internet. The technical specifications of the UMA is disclosed, for example, in www.umatechnology.org (non-patent document 1). In particular, the UMA Architecture (stage 2) document (non-patent document 2) discloses in detail the tunneling specifications of a portable telephone protocol using IPsec Protocol. Basically, an FMC terminal is a mobile terminal, but when used in a home, the FMC terminal can use a service through a fixed Internet as if it were a fixed terminal.

When communication business parties such as carriers do not provide the FMC service as an open service on the Internet in order to corral their customers, a combination with the VPN technology, which provides private services, is important. As for VPN software for connecting remote networks by using the VPN technology, introduction articles about creating Internet VPN environments such as VTun (virtual tunnel) and OpenVPN are published in UNIX Magazine Vol. 7 in 2004 and Vol. 8 in 2004 (non-patent document 3). By using software for Vtun or the like, a service can be provided which acts as if remote terminals and servers existed in an identical LAN (local area network).

A path control method used in a network where a plurality of paths can be selected is disclosed in which a terminal is connected to a destination address by a default path specified in advance (see patent document 1, for example).
Non-patent document 1: www.umatechnology.org
Non-patent document 2: UMA Architecture (stage 2) Document
Non-patent document 3: UNIX Magazine Vol. 7 in 2004 and Vol. 8 in 2004
Non-patent document 4: L2TPv2 (RFC 2661)
Non-patent document 5: L2TPv3 (RFC 3931)
Patent document 1: Japanese Unexamined Patent Application Publication No. Hei-11-112570

DISCLOSURE OF INVENTION

Problems to be Solved

To connect a portable terminal conforming to UMA to the Internet through a fixed access network, a CE (customer edge) router is separately required. For this reason, it is economically desired that the CE router already installed to accommodate fixed terminals in the Internet have a CE-router function for accommodating the portable terminal conforming to UMA. When the two functions are simply implemented in a single apparatus, however, the following problem occurs, for example.

The problem will be described with reference to FIG. 15. In FIG. 15, when a terminal M (104) accesses a server M (108), there are two relay paths (a path through a fixed ISP network (207) and a path through a mobile ISP network (209)).

When only a fixed Internet connection service is used, since there exists just the relay path passing through the fixed ISP network, it is not necessary to select a relay path. When an FMC service contract is made, it is necessary to provide a way to access the server M (108) through the mobile ISP network. When there exists a terminal having an FMC service contract in this manner, it is necessary for a CE router (101) to select a relay path according to a service type used by the terminal. A method to implement this function is an issue. The issue described above, which occurs when providing only for an accommodation terminal that has an FMC service contract, results in the issue which will be described below.

Specifically, when there exists a plurality of relay paths from a terminal accommodated in the CE router (101) to a server as access paths, it is necessary to select an optimum relay path from the plurality of relay paths by any method.

In view of the foregoing situation, an object of the present invention is to provide a relay network system that solves a multi-routing issue, which is an issue when an FMC service is provided for a user by using a conventional CE router. Another object of the present invention is to provide a simple way to select a relay path optimum for each service from a plurality of relay paths by introducing L2TP (Layer 2 Tunneling Protocol)—VPN. Still another object of the present invention is to avoid a security problem such as a DoS (denial of service) attack by providing an FMC service on a private network using L2TP-VPN because of no necessity of disclosing the IP address of a server as a DNS (domain name system) record on the Internet. Yet another object of the present invention is to provide a TE (traffic engineering) solution corresponding to MPLS (multi-protocol label switching), generally used in a core network, for an access network at a low cost by using L2TP, which is a standard VPN.

The present FMC relay network system is, for example, a communication system that includes a terminal adaptor apparatus which is connected to a network, which accommodates a fixed terminal and a mobile terminal at the same time, and which performs a relay operation; and a VPN termination network apparatus which accommodates a server for providing a service for the fixed terminal and a server for providing a service for the mobile terminal, and which terminates a VPN session with the terminal adaptor apparatus. The terminal adaptor apparatus includes means for identifying a fixed service session between the fixed terminal and the server that provides the service for the fixed terminal and a mobile service session between the mobile terminal and the server that provides the service for the mobile terminal by a VPN identifier attached to a packet and selecting a relay path according to the VPN identifier.

In the present FMC relay network system, the terminal adaptor apparatus may use L2TP as the above-described VPN, obtain the address of a server associated with the VPN identifier from the VPN termination network apparatus by using VPN Protocol, and then, send the address of the server to the terminal in advance.

In the present FMC relay network system, when obtaining the address of a server associated with the above-described VPN identifier from the VPN termination network apparatus by using VPN Protocol, the terminal adaptor apparatus may store the association relationship between the address of the server and the VPN identifier, and, when receiving a packet sent from a terminal to the server, VPN-capsulate the packet by using a VPN header that includes the VPN identifier.

In the present FMC relay network system, after the terminal adaptor apparatus obtains the address of a server associated with the above-described VPN identifier from the VPN termination network apparatus by using VPN Protocol, the terminal adaptor apparatus may send the address of the server obtained in advance to a terminal that has sent an address solution request for the server.

In the present FMC relay network system, the terminal adaptor apparatus may use, as the above-described VPN identifier, the MAC address of an access-source terminal, the IP address of an access-destination server, and data type information of the frame to be capsulated.

In the present FMC relay network system, when receiving a packet having the above-described VPN identifier, the terminal adaptor apparatus may compare the VPN identifier included in the received packet with a VPN identifier found with the MAC address of an access-source terminal and the IP address of an access-destination server being used as keys; when they match, convert the VPN identifier to a VLAN identifier; and relay to the server.

In the present FMC relay network system, after obtaining the address of the server that provides the fixed-terminal service from the VPN termination network apparatus by using VPN Protocol, the terminal adaptor apparatus may send the address of the fixed-terminal server to the mobile terminal.

In the present FMC relay network system, after obtaining the address of the server that provides the mobile-terminal service from the VPN termination network apparatus by using VPN Protocol, the terminal adaptor apparatus may send the address of the mobile-terminal server to the fixed terminal.

According to the first solving means of this invention, there is provided a relay network system comprising:

a terminal adaptor apparatus that has a management table where a transmission-source address of a packet, destination information indicating a destination address or a destination domain name of the packet, and relay path information indicating either through a fixed network or through a mobile network are stored in advance in association with each other, and that relays packets sent from a fixed terminal and a mobile terminal to the fixed network and the mobile network; and a termination network apparatus that accommodates a server for providing services for the fixed terminal and the mobile terminal, and that terminates a session through the fixed network and a session through the mobile network with the terminal adaptor apparatus;

wherein the terminal adaptor apparatus receives session establishment request which includes a transmission source address and destination information indicating the server, from either the fixed terminal or the mobile terminal;

refers to the management table according to the transmission source address and the destination information to acquire corresponding relay path information;

establishes session with the termination network apparatus through the fixed network or the mobile network according to the acquired relay path information;

stores session identifier for identifying the session in the management table in association with the transmission source address and the destination information of the session establishment request;

when receiving packet that includes transmission source address and destination information, from the fixed terminal or the mobile terminal, refers to the management table to acquire the session identifier corresponding to the transmission source address and the destination information; and relays the packet to the termination network apparatus by using the session through either the fixed network or the mobile network according to the acquired session identifier.

According to the second solving means of this invention, there is provided a terminal adaptor apparatus comprising:

a management table where a transmission-source address of a packet, destination information indicating a destination address or a destination domain name of the packet, and relay path information indicating either through a fixed network or through a mobile network are stored in advance in association with each other;

a signal processor that establishes a session through the fixed network and a session through the mobile network with a termination network apparatus that accommodates a server for providing services for a fixed terminal and a mobile terminal and terminates the sessions; and a transfer processor that relays packets sent from the fixed terminal and the mobile terminal to the fixed network and the mobile network;

wherein the signal processor receives session establishment request which includes a transmission source address and destination information indicating the server, from either the fixed terminal or the mobile terminal;

refers to the management table according to the transmission source address and the destination information to acquire corresponding relay path information;

establishes session with the termination network apparatus through the fixed network or the mobile network according to the acquired relay path information;

stores session identifier for identifying the session in the management table in association with the transmission source address and the destination information of the session establishment request; and the transfer processor, when receiving packet that includes transmission source address and destination information, from the fixed terminal or the mobile terminal, refers to the management table to acquire the session identifier corresponding to the transmission source address and the destination information; and relays the packet to the termination network apparatus by using the session through either the fixed network or the mobile network according to the acquired session identifier.

According to the present invention, it is possible to provide a relay network system that solves a multi-routing issue, which is an issue when an FMC service is provided for a user by using a conventional CE router. According to the present invention, it is also possible to provide a simple way to select a relay path optimum for each service from a plurality of relay paths by introducing L2TP (Layer 2 Tunneling Protocol)—VPN. According to the present invention, it is possible to avoid a security problem such as a DoS (denial of service) attack by providing an FMC service on a private network using L2TP-VPN because of no necessity of disclosing the IP address of a server as a DNS (domain name system) record on the Internet. Furthermore, according to the present invention is possible to provide a TE (traffic engineering) solution corresponding to MPLS (multi-protocol label switching), generally used in a core network, for an access network at a low cost by using L2TP, which is a standard VPN.

BRIEF DESCRIPTION OF THE DRAWINGS

FIG. 7 is a diagram showing the structure of a session management table of the L2TP server used in the present invention.

FIG. 9 shows example data formats of a server type AVP and a server address AVP.

FIG. 16 shows an example structure of a session management table of a CE router.

EMBODIMENT OF THE INVENTION

1. Source Policy Routing

Figure 1:
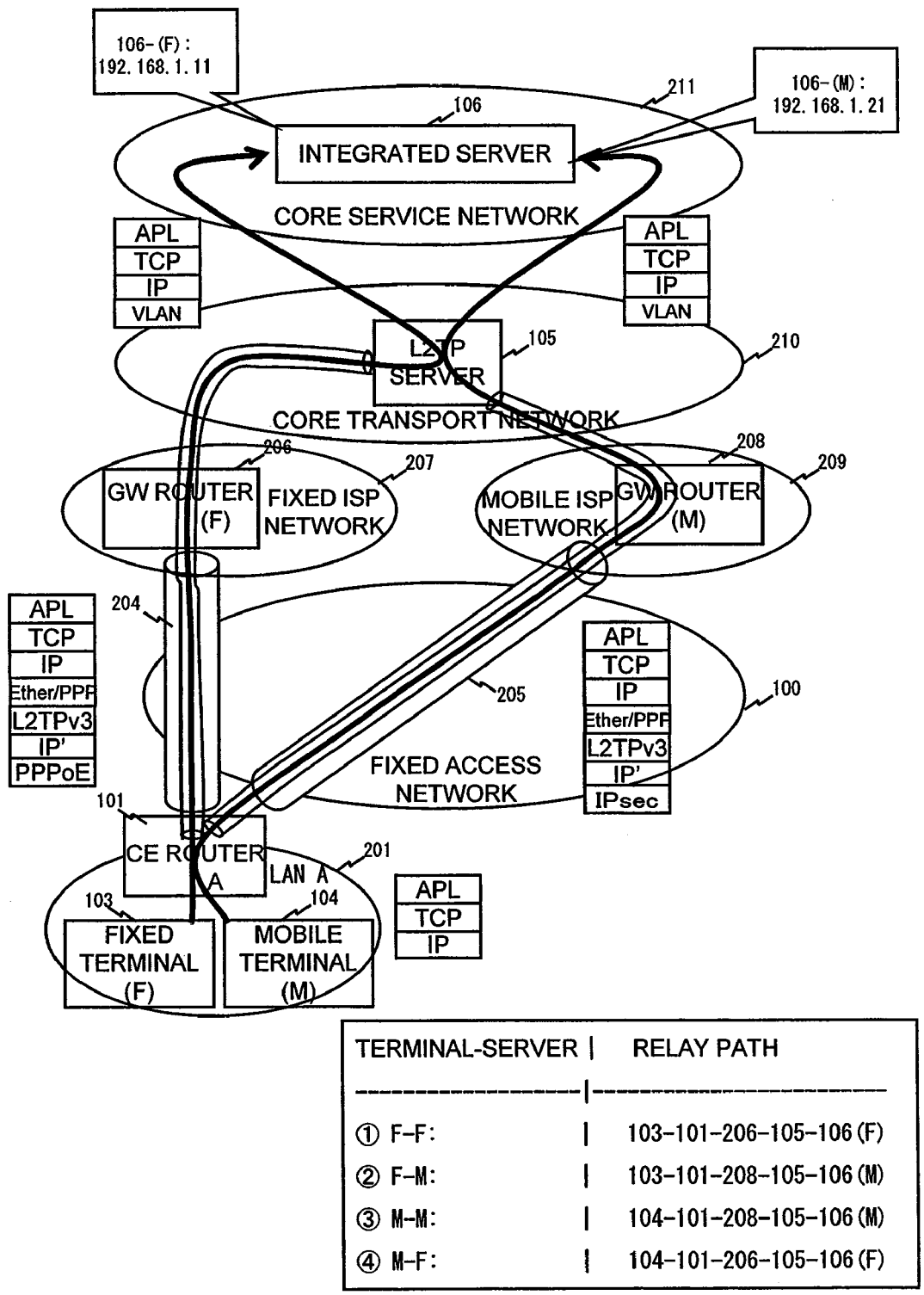
FIG. 1 is a diagram showing the structure of an FMC communication system that uses L2TP.

A source policy routing function is one of methods for selecting a relay path. This function uses an address assigned to a terminal, as a key to select a relay path. It is not sufficient to have this function only. The function and an issue will be described below with reference to FIG. 15.

In the source policy routing function of the CE router A (101), an IP routing mechanism in which not only a destination IP address indicating the server M (108) but also an IP address (transmission-source IP address) assigned to the terminal M (104) are used as path search keys is used to determine a relay path to the destination server uniquely. The terminal M (104) is, for example, a UMA terminal.

First, a service structure will be examined in which a GW router M (208) that accommodates a UMA terminal in a core service network (211) gives (assigns) a global IP address to the terminal M (104). The terminal M (104) sends a packet to the server with the assigned global IP address as a transmission source IP address. The CE router A (101) does not apply an IP masquerade function, which converts a transmission-source IP address, to a packet having a global IP address as a transmission-source address. Therefore, the CE router A (101) can determine from a transmission-source address (here, a global IP address) whether the fixed terminal F (103) or the mobile terminal M (104) sent the packet. By using the source policy routing function, an explicit selection of a relay path in which an access is made to the server M (108) through the mobile ISP network (209) can be implemented. In that case, the source policy routing function is implemented as a sub set of multi-routing, where, in a system having a plurality of routing tables, a combination of a transmission-destination IP address, a transmission-source IP address, and other IP header information is used as keys to select only one routing table among the plurality of routing tables.

Next, a case will be examined where a global IP address is not given to the terminal M (104).

Usually, the CE router A (101) applies so-called IP masquerade processing to a packet sent from the terminal M (104) having a private IP address to the server M (108) to convert the private IP address of the transmission source to a global IP address. This processing is often performed before the source policy routing processing, which determines an output path of the packet. Therefore, the transmission-source address is rewritten to a WAN (wide area network) address of a network interface at a default side on the routing table of the CE router A (101). Consequently, unlike the case described above, it becomes impossible to determine an explicit relay path according to the transmission-source IP address assigned to the terminal M (104). Even in this case, only when a UMA portable terminal having a global IP address and a fixed Internet connection terminal having a private IP address are accommodated in a LAN environment of an existing CE router in a mix manner and the terminals access servers through two relay paths, if the default path of the CE router is specified through the fixed ISP network, an optimum relay path can be selected as a result. When there are three or more relay paths, however, the source policy routing is insufficient as an optimum path selection algorithm. To use three or more network services by the CE router in the future, it is demanded that multi-routing should be implemented, in which a relay path optimum for each network service determined by the type (for example, a usual fixed Internet terminal or a UMA portable terminal) of a terminal accommodated by the CE router is selected (irrespective of the IP address).

2. Embodiment Using a L2TP Server

As means for implementing the above-described multi-routing, which is irrespective of the IP address, a multi-routing function in which a network service is associated with a session ID of L2TP, which is means for implementing VPN, and a relay path is selected according to the session ID associated with the service is introduced into the CE router and a L2TP server serving as an apparatus opposing the CE router, at the network side. L2TP Protocol has been standardized by IETF (Internet Engineering Task Force) as L2TPv2 (RFC 2661) and L2TPv3 (RFC 3931) (non-patent documents 4 and 5). In the L2TP standards, two logical communication channels (control channel and data channel) are defined. The control channel establishes or releases a control connection and a session. The data channel uses a session established by the control channel to perform actual data transfer processing with the use of an L2TP session header. The L2TP session header is capsulated by an IP header (only in L2TPv3) or by a UDP header and an IP header.

FIG. 1 shows an FMC communication system using L2TP-VPN.

The present communication system includes networks, such as LAN A (201) to which the CE router A belongs, a fixed access network (100), the fixed ISP network (207), the mobile ISP network (209), a core transport network (210), and a core service network (211). The present communication system includes, for example, the CE router (terminal adaptor apparatus) A (101), operating as an L2TP client; a server (106) placed in the core service network (211), for providing a service for both the fixed terminal F (103) and the mobile terminal M (104); and a L2TP server (termination network apparatus) (105) placed in the core transport network (210), for terminating L2TP for the fixed terminal F (103) and the mobile terminal M (104) and for terminating VLAN (virtual LAN) for the server (106). The fixed terminal F (103) and the mobile terminal M (104) are connected to LAN A (201). Outside the area of LAN A (201), the mobile terminal M (104) can connect to the server (106) through a wireless access network in the same way as a usual mobile terminal. When the mobile terminal M (104) enters the area of LAN A (201), the mobile terminal M (104) or the CE router A (101) automatically recognizes the fact and the mobile terminal M (104) is connected to the server (106) through the CE router A (101).

Figure 14:
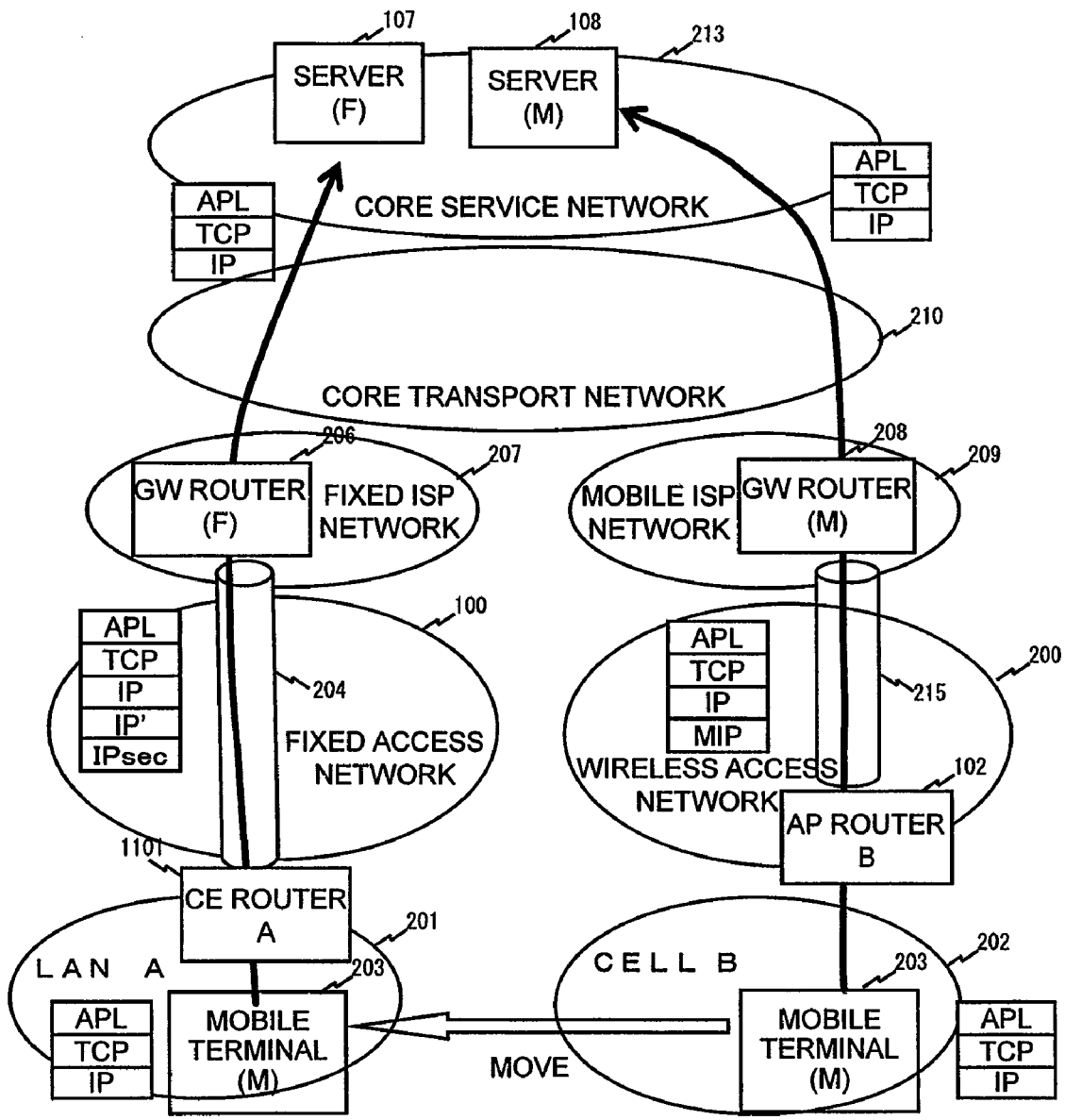
FIG. 14 is a diagram showing the structure of a communication system that does not use L2TP.
Figure 15:
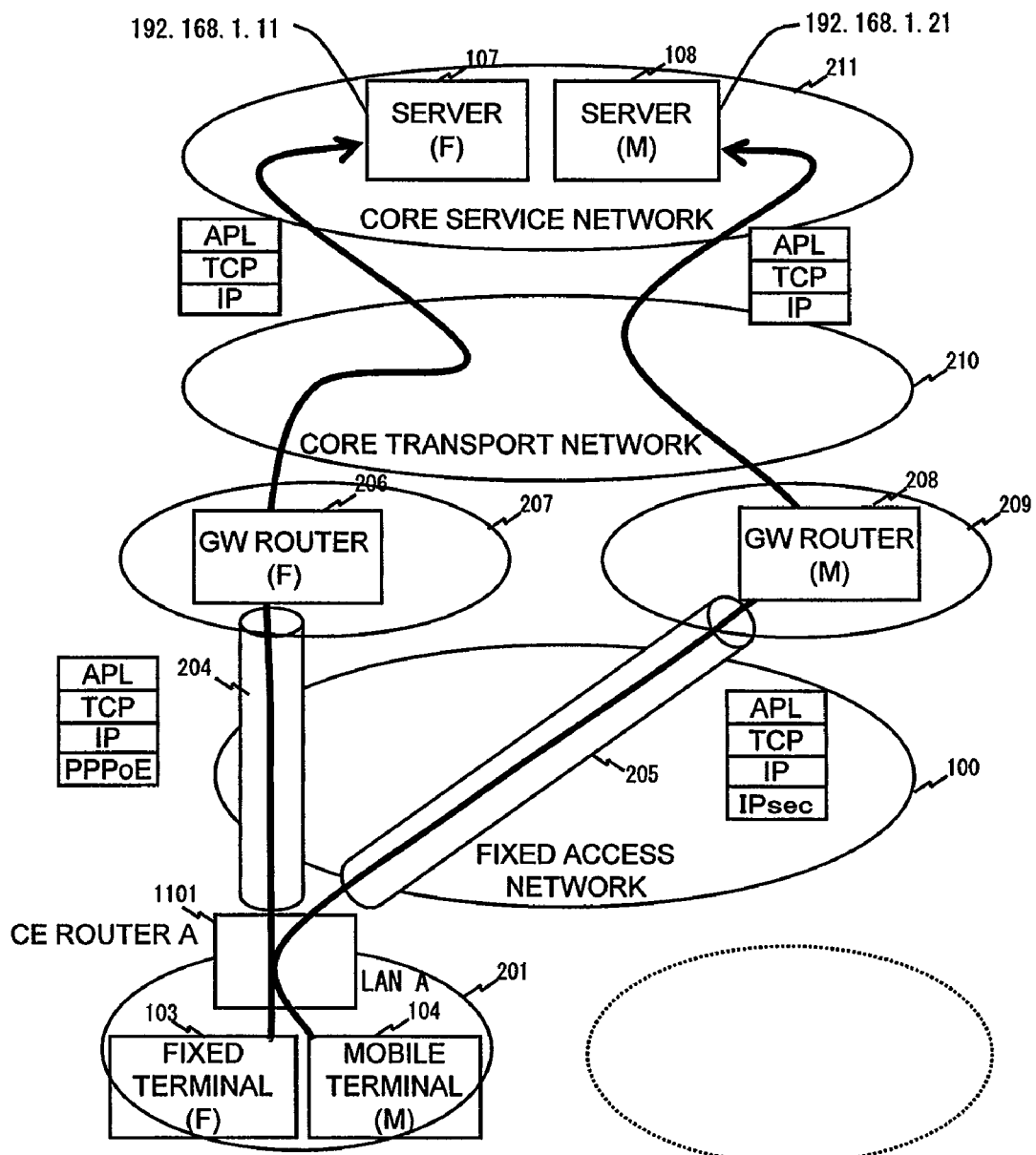
FIG. 15 is a diagram showing the structure of an FMC communication system that does not use L2TP.

As shown in FIG. 1, in the spread period of FMC services, the FMC services can be provided by the single server (106) placed in the core service network (211). In contrast, in the initial introduction period of FMC services, it is thought as shown in FIG. 14 and FIG. 15 that the server in the core service network (211) is separated into a server F (107) for providing a service for a fixed LAN terminal and a server M (108) for providing a service for a mobile LAN terminal. In the present embodiment, a description is made on the assumption that the server is formed of a single integrated server (106), but a plurality of servers may be provided.

Services that can be provided by the FMC communication system shown in FIG. 1 will be described.

A LAN-type FMC service will be described first as an example service that can be provided as an FMC service. As a LAN-type FMC service, a so-called IP-Centrex service can be mentioned, for example, where a home server usually installed at a home is installed not at a home but at a service network owned by the service provider. In a LAN-type FMC service, a terminal in a LAN is connected to the server in the service network through a communication device such as an Ethernet (registered trademark) at the L2 level. To provide such a wide-area Ethernet service as a VPN service, the L2TPv3 standard, which can support Ethernet over L2TP tunneling, is used, for example.

Next, a WAN-type FMC service will be described. As WAN-type FMC services, an electronic mail service, a video on demand (VoD) service, and others can be mentioned. When a large-volume file is downloaded from a server, it is better both in speed and cost to download it through a CE router installed at the home, not at a place where you visit. In a WAN-type FMC service, a terminal in a LAN needs to be connected to the server in the service network at the IP level. The L2TPv2 or L2TPv3 standard is used, for example, which supports PPP over L2TP tunneling.

A L2TP connection is introduced between the CE router A (101) and the L2TP server (105), shown in FIG. 1, to configure a VPN (L2TP-VPN) that connects the points. The L2TP connection connects the home LAN and the core service network by the VPN.

With the use of a label multiplex function of L2TP, which uses session IDs (session identifiers), a fixed-terminal service session and a mobile-terminal service session can be logically multiplexed on an identical IP session in one L2TP-VPN. In addition, when a VPN routing function that uses labels called L2TP session IDs is implemented in the VPN termination apparatus (the CE router and the L2TP server), a service can be explicitly associated with a path used for the service, allowing the FMC service to be realized.

A PPPoE (Point-to-Point Protocol over Ethernet) tunnel (204) is used, for example, to connect between the GW router F (206) installed in the fixed ISP network (207) and the CE router A (101). A IPsec tunnel (205) is used, for example, to connect the GW router M (208) installed in the mobile ISP network (209) and the CE router A (101). Internet Protocol is used to connect the fixed ISP network (207), the mobile ISP network (209), the core transport network (210), and the core service network (211).

In the present embodiment, a virtual FMC session specified between the terminal (103 or 104) and the server (106) is performed by mapping it to a session ID of the actual L2TP tunnel specified between the CE router A (101) and the L2TP server (105). The CE router A (101) and the L2TP server (105) selects a relay path (204 or 205) between the fixed terminal F (103) or the mobile terminal M (104) and the server (106) according to the session ID of the L2TP tunnel and the VLAN ID.

The integrated server (106) has two IP addresses. For example, it has an address (in the case shown in the figure, 192.168.1.11, hereinafter called a first address 106-F) corresponding to a server that provided a fixed-terminal service and an address (in the case shown in the figure, 192.168.1.21, hereinafter called a second address 106-M) corresponding to a server that provided a mobile-terminal service. In the present embodiment, the mobile terminal M (104) can use the fixed-terminal service and the fixed terminal F (103) can use the mobile-terminal service. The integrated server (106) has the two IP addresses, as described above, but it may have just one IP address.

Relay paths from the fixed terminal F (103) and the mobile terminal M (104) to the server (106) will be described here.

A first path (F-F) is a connection from the fixed terminal F (103) to the first address (106-F) of the server (106). The first path is established, for example, from the fixed terminal F (103) to the server (106-F) through the CE router A (101), the GW router F (206), and the L2TP server (105). A second path (F-M) is a connection from the fixed terminal F (103) to the second address (106-M) of the server (106). The second path is established, for example, from the fixed terminal F (103) to the server (106-M) through the CE router A (101), the GW router M (208), and the L2TP server (105).

A third path (M-M) is a connection from the mobile terminal M (104) and the second address (106-M) of the server (106). The third path is established, for example, from the mobile terminal M (104) to the server (106-M) through the CE router A (101), the GW router M (208), and the L2TP server (105). A fourth path (M-F) is a connection from and the GW router M (208) to the first address (106-F) of the server (106). The fourth path is established, for example, from the mobile terminal M (104) to the server (106-F) through the CE router A (101), the GW router F (206), and the L2TP server (105).

Figure 2:
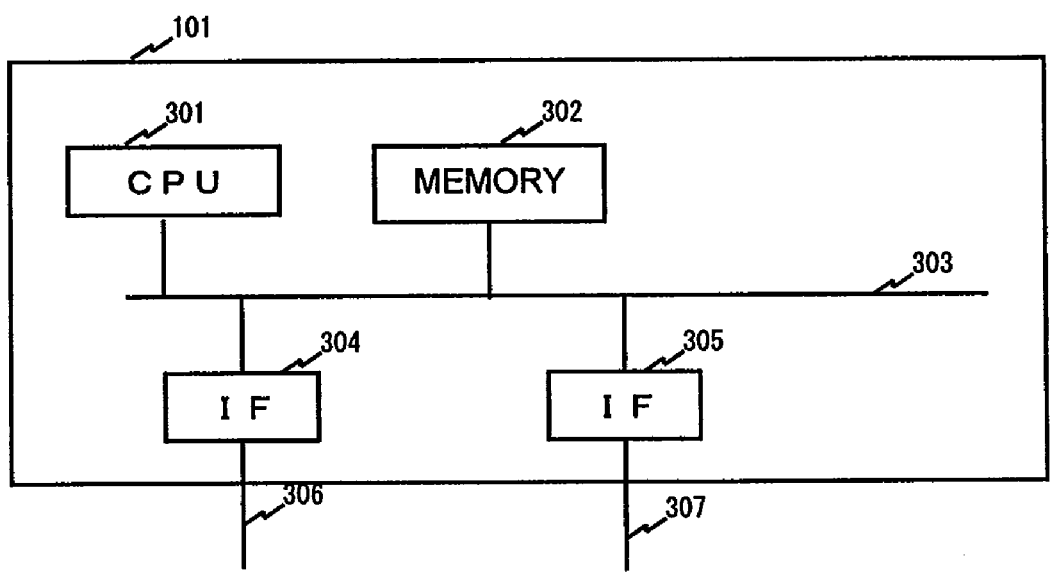
FIG. 2 is a schematic diagram showing the hardware structure of a CE router used in the present invention.

FIG. 2 shows an example hardware structure of the CE router A (101).

The CE router A (101) includes a CPU (central processing unit) (301), a memory (302), and network interfaces (304 and 305). The CPU (301) actually executes various application programs and an OS (operating system). The memory (302) stores a program used in the execution at the CPU (301) and the various application programs. The CPU (301), the memory (302), and the interfaces (304 and 305) are connected to each other via a bus (303). The number of interfaces is not limited to that shown in the figure, but may be any appropriate number.

The interfaces (304 and 305) send data received from the CPU (301) and the memory (302), to an external unit. The interfaces (304 and 305) are connected to lines (306 and 307), respectively. One of the interfaces (304 and 305) is connected, for example, to a line connected to the fixed access network (100). One or a plurality of the interfaces (304 and 305) serves as a wired or wireless interface for connecting to the fixed terminal F (103) and the mobile terminal M (104).

Figure 3:
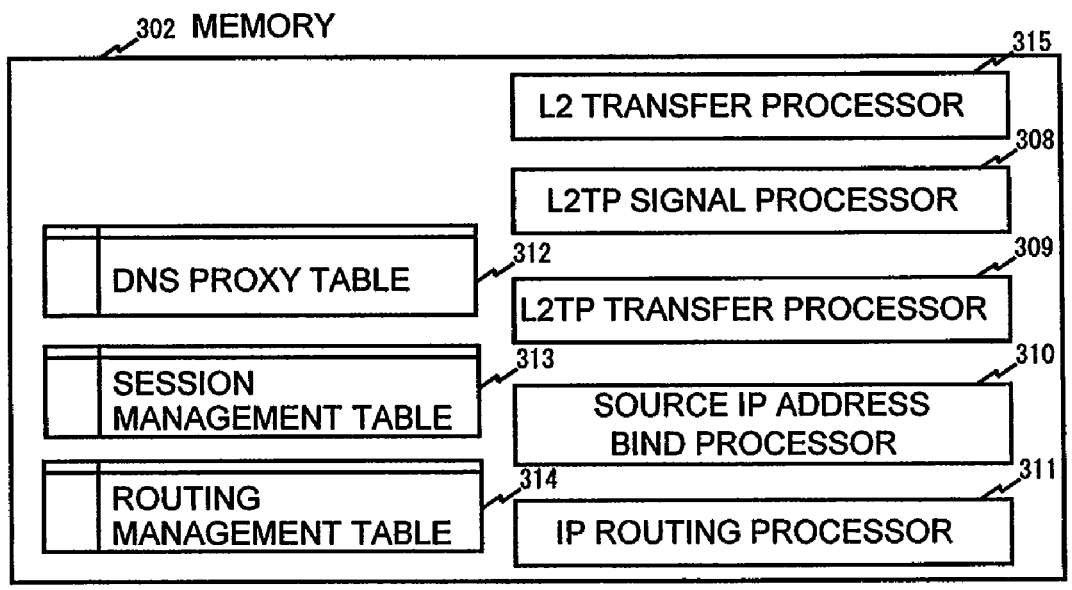
FIG. 3 is a schematic diagram showing the software structure of the CE router used in the present invention.

FIG. 3 shows information stored in the memory (302) of the CE router A (101). The memory (302) stores, for example, tables such as a DNS proxy table (312), a session management table (313), and a routing management table (314), and programs such as an L2 transfer processor (315), an L2TP signal processor (308), an L2TP transfer processor (309), a source IP address bind processor (310), and an IP routing processor (311). Each program can be read and executed by the CPU (301).

The L2TP signal processor (308) includes a call processor for establishing and releasing a control connection between the CE router A (101) and the L2TP server (105), and a session manager for establishing and releasing a session between the CE router A (101) and the L2TP server (105). The L2TP transfer processor (309) performs L2TP capsulation for a data frame received from the LAN A (201) and L2TP decapsulation for an L2TP data frame received from the WAN (in the case shown in FIG. 1, the fixed access network 100).

The source IP address bind processor (310) determines a transmission-source IP address according to relay path information of the session management table (313). The IP routing processor (311) performs IP routing according to the IP header determined by the IP address bind processor (310). The L2 transfer processor (315) performs L2 transfer.

The DNS proxy table (312) stores information used to perform a process for returning the IP address of the server (106) in response to a server domain name solution inquiry sent from the terminal (103 or 104). The DNS proxy table (312) also stores information used to perform a process for returning a server domain name in response to a server IP address solution inquiry. The routing management table (314) is, for example, a table for IP routing. The session management table (313) will be described in detail later.

Figure 4:
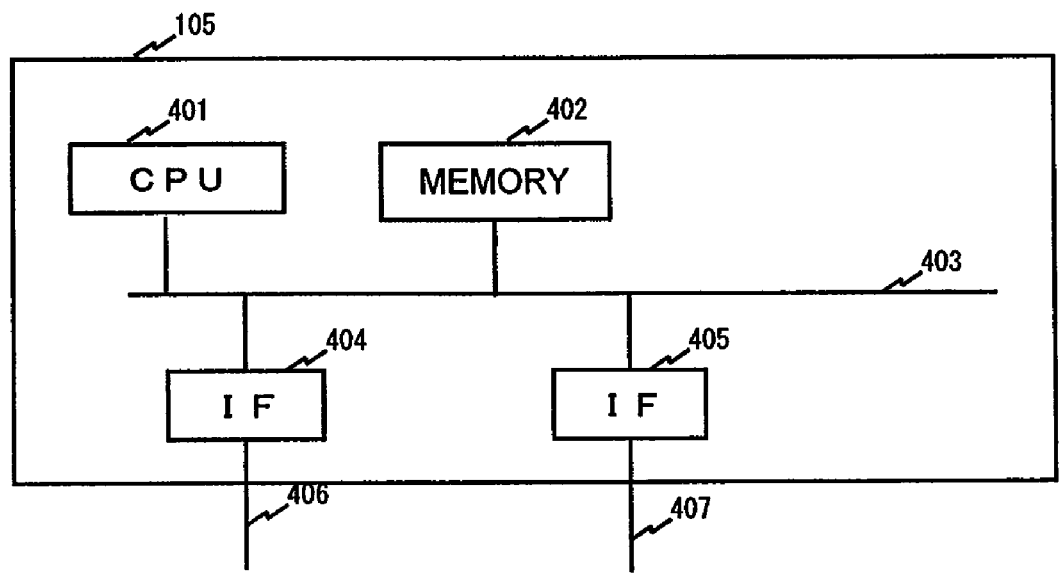
FIG. 4 is a schematic diagram showing the hardware structure of an L2TP server.

FIG. 4 shows an example hardware structure of the L2TP server (105).

The L2TP server (105) includes a CPU (401), a memory (402), and network interfaces (404 and 405). The CPU (401) actually executes various application programs and an OS (operating system). The memory (402) stores a program used in the execution at the CPU (401) and the various application programs. The CPU (401), the memory (402), and the interfaces (404 and 405) are connected to each other via a bus (403). The number of interfaces is not limited to that shown in the figure, but may be any appropriate number.

The interfaces (404 and 405) send data received from the CPU (401) and the memory (402), to an external unit. The interfaces (404 and 405) are connected to lines (406 and 407), respectively. One or a plurality of the interfaces (404 and 405) is connected, for example, to the fixed ISP network (207) and the mobile ISP network (209). One or a plurality of the interfaces (404 and 405) is connected to the core service network (211).

Figure 5:
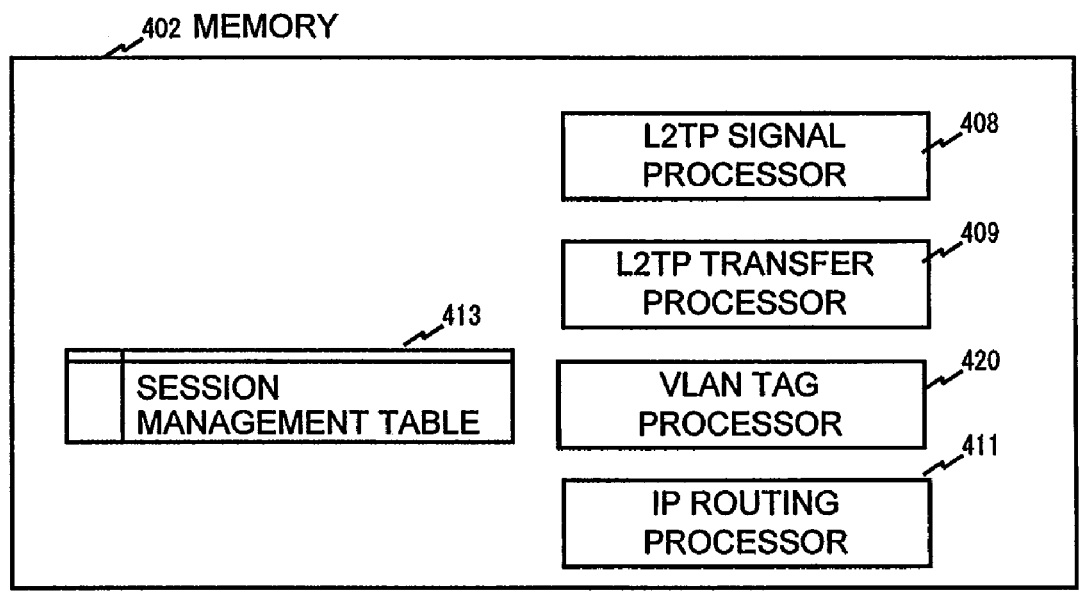
FIG. 5 is a schematic diagram showing the software structure of the L2TP server used in the present invention.

FIG. 5 shows information stored in the memory (402) of the L2TP server (105).

The memory (402) stores, for example, a session management table (413), and programs such as an L2TP signal processor (408), an L2TP transfer processor (409), an IP routing processor (411), and a VLAN tag processor (420). A routing management table may be further stored. The difference with the CE router A (101) is, for example, that the DNS proxy table (312) and the source IP address bind processor (310) are removed and the VLAN tag processor (420) is added. A description is omitted for the same components as the CE router A (101).

When an L2TP session having a PW (pseudo wire) type of Ether is terminated, the VLAN tag processor (320) performs mapping of the L2TP session ID and a VLAN tag. If the VLAN tag processor is not provided, it is difficult to separate L2 traffic received from a plurality of LANs, at the inlet of the server when a LAN-type FMC service is provided. VLAN tags are provided in order to separate L2 traffic received from a plurality of LANs. The session management table (413) will be described in detail later.

(Table Structure)

Figure 6:
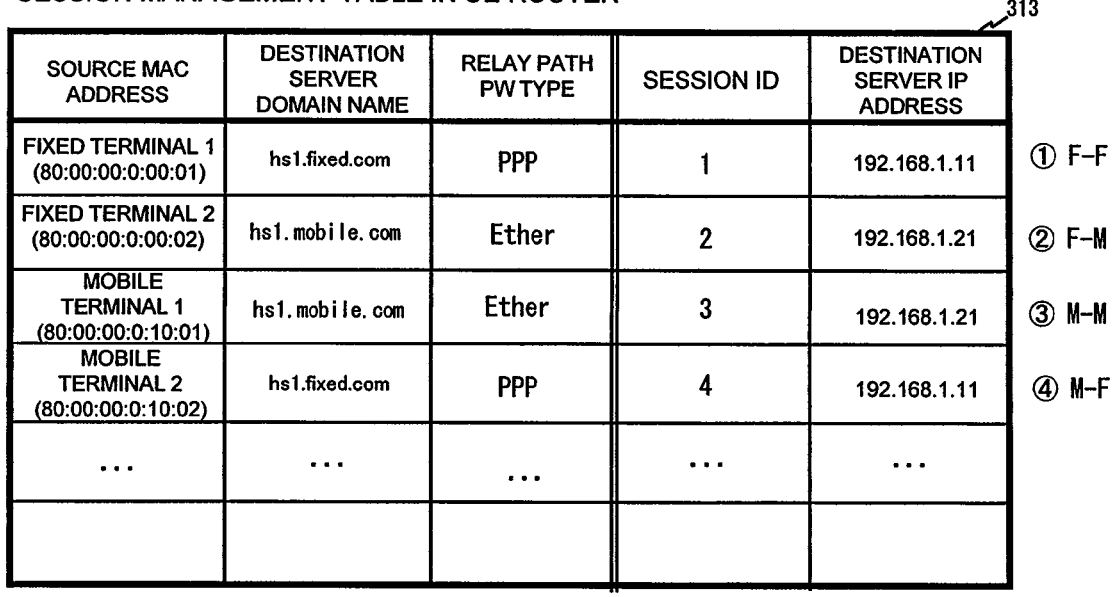
FIG. 6 is a diagram showing the structure of a session management table of the CE router used in the present invention.

FIG. 6 shows an example structure of the session management table (313) of the CE router A (101).

The session management table (313) includes a source MAC address field for storing the MAC address of the terminal (103 or 104) managed by the CE router A (101); a destination server domain name field for storing the domain name of the server (106) which the terminal (103 or 104) accesses; a relay path PW type field for indicating a relay path; an L2TP session ID field for storing a session ID exchanged at the L2TP signal processor (308); and a destination server IP address field for storing an IP address corresponding to the destination server domain name. The relay path PW type is set to "Ether", for example, when the mobile ISP network (209) is used; and the PW type is set to "PPP" when the fixed ISP network (207) is used. In addition to these settings, appropriate identification information indicating that the mobile ISP network (209) is used and the fixed ISP network (207) is used.

In the figure, the items (source MAC address, destination server domain name, and relay path PW type) located at the left of a doubled line are determined by provisioning. For example, these items can be determined in advance by the user through the management interface of the CE router A (101) or determined in advance by the carrier or the FMC service provider according to the conditions of the contract with the user. The items (session ID and destination server IP address) located at the right of the doubled line are determined and stored by L2TP Protocol. A process for storing the session ID and destination server IP address will be described in detail later. The case shown in the figure corresponds to the first path to the fourth path described before.

The DNS proxy table (312) of the CE router A (101) has a function for performing an IP address solution corresponding to the DNS domain name of the destination server (106) which the terminal (103 or 104) accesses, as a proxy of the terminal, for caching the name solution result in itself, and for managing it. It is also possible to have a configuration in which, in response to a DNS name solution request sent from the terminal (103 or 104), the CE router A (101) returns the IP address stored in the destination server IP address field of the session management table (313) as an IP address managed by itself. In that case, information associating the IP address and DNS domain name, which is managed by the DNS proxy table (312) can be included in destination server information of the session management table (313).

FIG. 7 shows an example structure of the session management table (413) of the L2TP server (105).

The session management table (413) includes a source MAC address field for storing the MAC address of the terminal (103 or 104) managed by the CE router A (101); a destination server domain name field for storing the domain name of the server (106) which the terminal (103 or 104) accesses; a destination server IP address field for storing an IP address corresponding to the destination server domain name; a VLAN ID field for storing a VLAN ID identifying the VLAN with the destination server (106); and an L2TP session ID field for storing a session ID exchanged at the L2TP signal processor (408). The differences from FIG. 6 are, for example, that the relay path field is removed and the VLAN ID field is added.

In the figure, the items (source MAC address, destination server domain name, destination server IP address, and VLAN ID) located at the left of a doubled line are determined by provisioning. For example, these items can be determined in advance through the management interface of the L2TP server (105). The source MAC address and destination server domain name may be received from the CE router A (101). The item (session ID) located at the right of the doubled line is determined and stored by L2TP Protocol. A process for storing the session ID will be described in detail later.

(Operation Outline)

As shown in FIG. 1, in the spread period of FMC services, the FMC services can be provided by the single server (106) placed in the core service network (211). In contrast, in the initial introduction period of FMC services, it is thought as shown in FIG. 14 and FIG. 15 that the server in the core service network (211) is separated into the server F (107) for providing a service for a fixed LAN terminal and the server M (108) for providing a service for a mobile LAN terminal.

An outline of operation for realizing the above-described service will be described as the case shown in FIG. 1 as an example. When the fixed terminal F (103) needs to access the server (106), which provides the service for fixed terminals, the CE router A (101) specifies in advance, as an L2TP client, an L2TP session through the fixed ISP network (207) with the L2TP server (105). Then, the CE router A (101) is configured such that an L2TP header that includes the L2TP session ID exchanged by L2TP signal processing protocol between the client and server is given to a data packet sent from the fixed terminal F (103) to the server (106) and an output path through the fixed ISP network (207) is selected according to the given L2TP session ID. For example, in FIG. 6, the sessions corresponding to session IDs 1 and 4 are established through the fixed ISP network (207). Therefore, when a data packet to which an L2TP header that includes session ID 1 or 4 is given is output by selecting the session corresponding to the session ID, an output path through the fixed ISP network can be selected.

When the mobile terminal M (104) needs to access the server (106), which provides the service for mobile terminals, the CE router A (101) specifies in advance, as an L2TP client, an L2TP session through the mobile ISP network (209) with the L2TP server (105). Then, the CE router A (101) is configured such that an L2TP header that includes the L2TP session ID is given to a data packet sent from the mobile terminal M (104) to the server (106) and an output path through the mobile ISP network is selected according to the given L2TP session ID. For example, in FIG. 6, the sessions corresponding to session IDs 2 and 3 are established through the mobile ISP network (209). Therefore, when a data packet to which an L2TP header that includes session ID 2 or 3 is given is output by selecting the session corresponding to the session ID, an output path through the mobile ISP network (209) can be selected.

An FMC terminal, evolving from a mobile terminal, can establish a session through a mobile ISP network with a server that provides a fixed terminal service although the FMC terminal is basically a mobile terminal. Various FMC services can be provided when such flexible L2TP sessions are allowed.

(Session Establishment Process)

Figure 8:
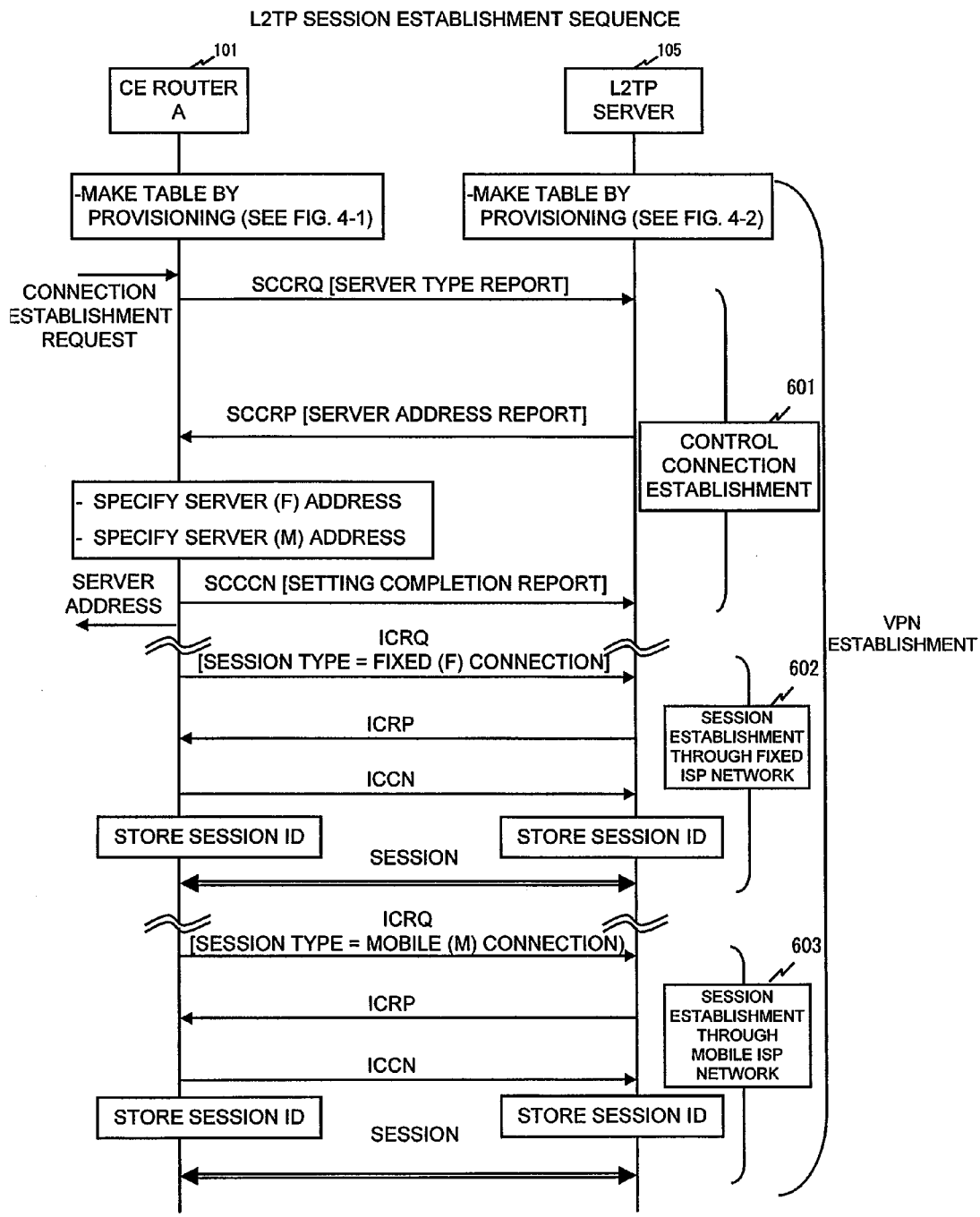
FIG. 8 is an L2TP session establishment sequence diagram.

FIG. 8 shows a control connection establishment process flow for establishing an L2TP session and a session establishment process flow. Each process is executed, for example, by the L2TP signal processor (308) of the CE router A (101) and the L2TP signal processor (408) of the L2TP server (105). As described above, the session management tables (313 and 413) have been specified by provisioning in the CE router A (101) and the L2TP server (105).

The CE router A (101) and the L2TP server (105) execute the control connection establishment process (601). In the control connection establishment process (601), the CE router A (101) first generates an AVP (attribute value pair) in order to establish a control connection. For example, in response to a session establishment request sent from the fixed terminal F (103) or the mobile terminal M (104), the CE router A (101) generates a server-type AVP in addition to a usual AVP when the control connection is established. The session establishment request sent from the fixed terminal F (103) or the mobile terminal M (104) includes the transmission-source MAC address and destination server domain name. An AVP means not a group of two items (label and a value given to the label) but a group of three items (label, a value given to the label, and an attribute).

FIG. 9(a) shows an example data format of the server-type AVP. The server-type AVP is used, for example, by the CE router A (101) to obtain the IP address of a server (106) which can provide an FMC server, disposed beyond the L2TP server (105). To obtain the address of a server which provides a fixed-terminal service, an AVP that specifies "server type=fixed (F) (server type. 1) is added to a usual AVP, for example. To obtain the address of a server which provides a mobile-terminal service, an AVP that specifies "server type=fixed (M) (server type. 2) is added to a usual AVP, for example. The CE router A (101) adds the generated AVP to a start-control-connection-request (SCCRQ) and sends it to the L2TP server (105). The CE router A (101) may send the SCCRQ through either the fixed ISP network (207) or the fixed ISP network (209).

To send a start-control-connection-reply (SCCRP) in response to the SCCRQ, the L2TP server (105) generates an AVP to be given to the SCCRP. The L2TP server generates a server address AVP in addition to an AVP for control connection establishment.

FIG. 9(b) shows an example data format of the server address AVP. The server address AVP is used, for example, by the L2TP server (105) to report the IP address of the server (106) disposed beyond the L2TP server (105) to the terminal (103 or 104). As a way to report the server address to the terminal (103 or 104), a DNS server or a DHCP (Dynamic Host Configuration Protocol) is used in a conventional open communication system. In contrast, in the present embodiment, the address of a server dedicated to a closed FMC service on the basis of L2TP-VPN is reported with the use of an AVP extension of L2TP because the address is not made public to the Internet. Unlike an open FMC service, the closed FMC service means a service obtained by combining a CUG (closed user group) service where only members who are allowed to access can access and an FMC service.

The L2TP server (105) adds, for example, the IP address of a server corresponding to the server type included in the server-type AVP in the SCCRQ to the AVP. When the server type is "fixed (F)", the L2TP server (105) adds the address (in the case shown in FIG. 1, 192.168.1.11) of the integrated server (106) for fixed terminals. When the server type is "mobile (M)", the L2TP server (105) adds the address (in the case shown in FIG. 1, 192.168.1.21) of the integrated server (106) for mobile terminals. These addresses can be stored in a memory in advance in association with the server types. The L2TP server (105) adds the generated AVP to the SCCRP and sends it to the CE router A (101).

When the CE router A (101) receives a response message of the SCCRQ, the CE router A (101) analyzes the message to determine whether it is an SCCRP. When the received message is an SCCRP, the CE router A (101) analyzes the AVP given to the message. The CE router A (101) obtains the IP address of the server corresponding to the server address AVP shown in FIG. 9(b), and specifies it in the session management table (313). For example, the CE router A (101) stores the IP address of the server, obtained corresponding to the transmission source address and the destination server domain name of the request received from the fixed terminal F (103) or the mobile terminal M (104), in the received-light server IP address field. It may be stored in the DNS proxy table (312).

After sending the SCCRP, the L2TP server (105) awaits until it receives a start-control-connection-connected (SC-CCN). Receiving the SCCCN, the L2TP server (105) establishes a control connection and ends the control connection establishment process. The CE router A (101) may send the obtained server address to the terminal (103 or 104) at appropriate timing.

The SCCRQ signal, SCCRP, and the SCCCN signal form a three-way hand shake signal, and mean a L2TP service start report from the client, a service permission report from the server, and a service setting completion report from the client. Only one L2TP control connection is established between the client and server, and then, an actual section is established on that service by using the following signals.

After the control connection is established, the CE router A (101) executes session establishment processes (602 and 603). More specifically, according to the transmission-source MAC addresses and destination server domain names included in the session establishment requests sent from the fixed terminal F (103) and the mobile terminal M (104), the CE router A (101) first refers to the session management table (313) to obtain corresponding relay path PW types. According to the PW type, the CE router A (101) sends an ICRQ signal to the L2TP server (105) through the fixed ISP network (207) or the mobile ISP network (209). For example, when the PW type is "PPP", the CE router A (101) executes the session establishment process (602) through the fixed ISP network (207). In contrast, when the PW type is "Ether", the CE router A (101) executes the session establishment process (603) through the mobile ISP network (209). The session establishment process (602) through the fixed ISP network (207) and the session establishment process (603) through the mobile ISP network are the same except that the networks used differ.

In the session establishment processes (602 and 603), messages such as an incoming-call-request (ICRQ), an incoming-call-reply (ICRP), and an incoming-call-connected (ICCN) are exchanged to establish the fixed-terminal session and the mobile-terminal session.

The ICRQ signal, the ICRP signal, and the ICCN signal form a three-way hand shake signal, and mean a L2TP start report from the client, a session permission report from the server, and a session setting completion report from the client, on an L2TP control connection established by the SCCRQ, SCCRP, and SCCCN signals.

When the sessions are established, the CE router A (101) stores session IDs for identifying the sessions in the session management table (313). For example, the session IDs are stores in association with the transmission-source MAC addresses and the destination server domain names included in the session establishment requests sent from the fixed terminal F (103) and the mobile terminal M (104).

When the sessions are established, the L2TP server (105) also stores session IDs for identifying the sessions in the session management table (413). For example, the session IDs are stores in association with the transmission-source MAC addresses of the fixed terminal F (103) and the mobile terminal M (104), and the destination server domain name or destination server IP address. The transmission-source MAC addresses of the fixed terminal F (103) and the mobile terminal M (104), and the destination server domain name or destination server IP address are obtained from the CE router A (101) at any timing during the session establishment processes. With the above-described processes, the L2TP sessions are established between the CE router A (101) and the L2TP server (105).

(Packet Transfer Process)

Figure 10:
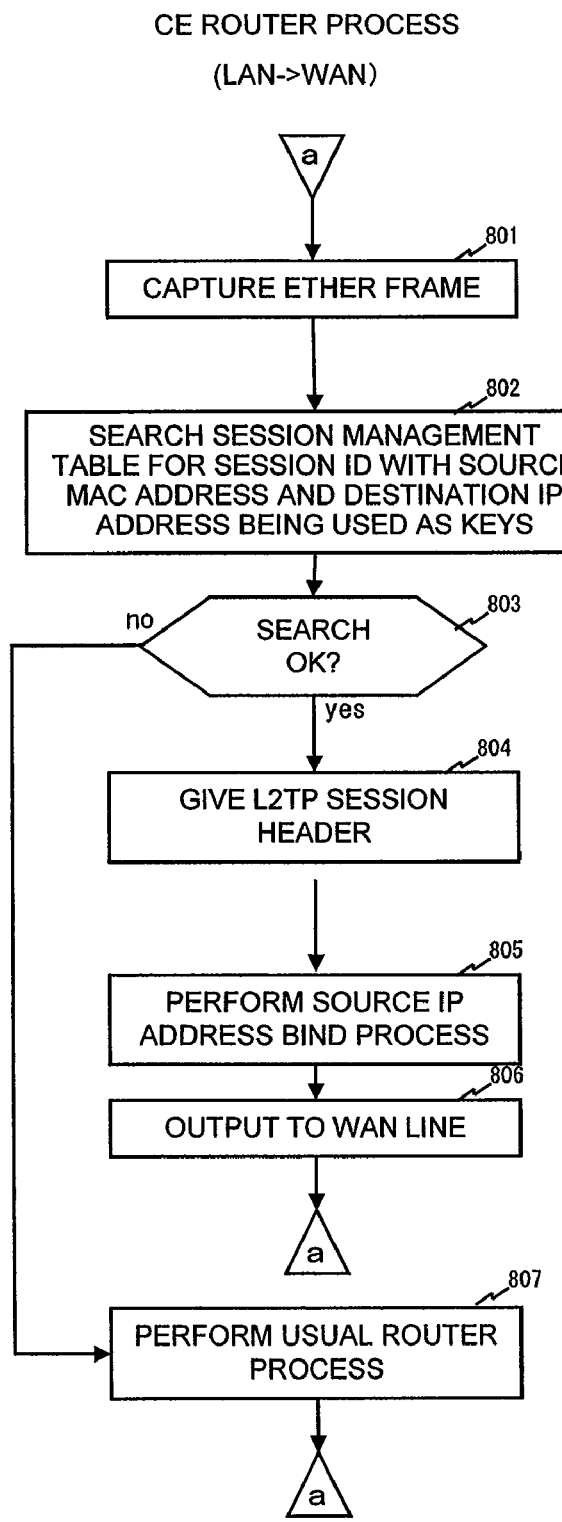
FIG. 10 is a diagram showing a transfer process sequence of the CE router used in the present invention.
Figure 11:
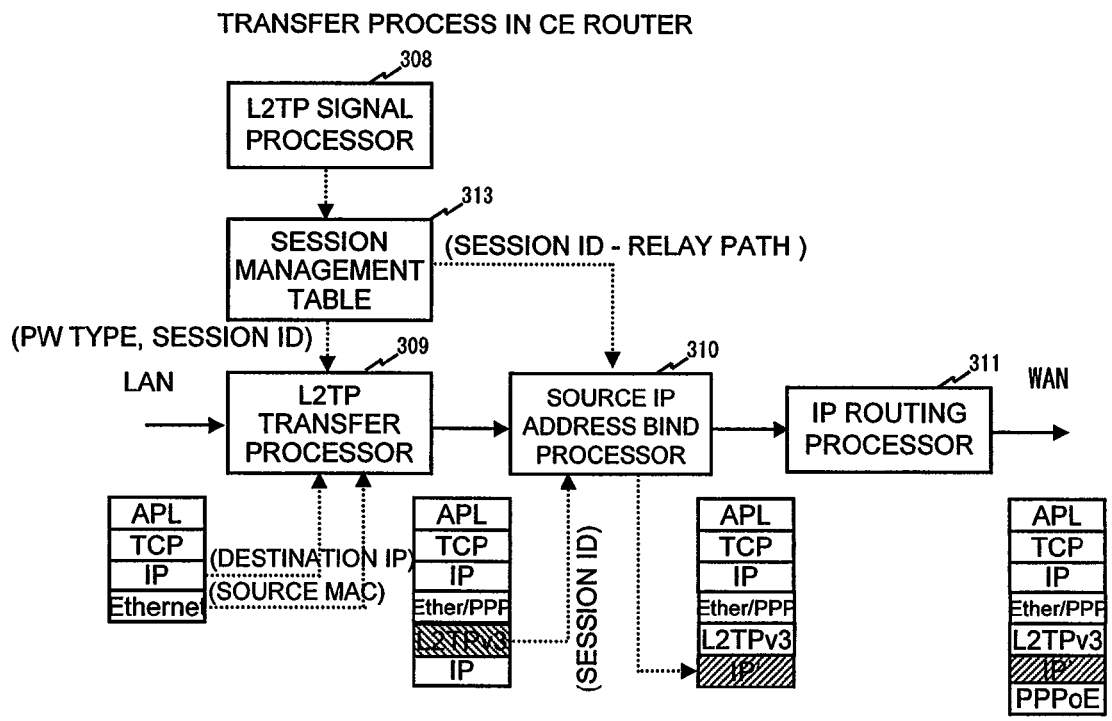
FIG. 11 is a diagram showing an upstream transfer process of the CE router used in the present invention.

FIG. 10 is a flowchart of a packet transfer process in the CE router A (101). FIG. 11 is a diagram showing a data packet transfer process from a LAN line to a WAN line in the CE router A (101).

Prior to data transfer, the L2TP signal processor (308) executes the processes shown in FIG. 8 in advance to generate the session management table (313), shown in FIG. 6. In the CE router A (101), the L2TP transfer processor (309) captures an Ether frame (801) in the data frame input from the LAN A (201). Then, the L2TP transfer processor (309) searches the session management table (313) with the source MAC address and destination IP address extracted from the captured Ether frame as keys (802). When the search was successful (when the source MAC address and destination IP address were found) (803), the L2TP transfer processor (309) gives an L2TP session header (804). For example, the corresponding session ID and PW type are obtained from the session management table (313) and a L2TP session header that includes the obtained session ID is given to the capture Ether frame. The L2TP transfer processor (309) also gives the PW type to the Ether frame at appropriate timing. When the search was unsuccessful (803), an L2TP header is not given and a usual CE router routing process is executed (807).

After the process 804, the source IP address binding processor (310) determines the source IP address (805). The source IP address binding process is similar to an IP masquerade process generally performed by a usual CE router, in which the transmission source IP address is converted from the LAN local address to a WAN global address, but differs from the IP masquerade process in that, even when a plurality of IP addresses is given at the WAN side, a socket bind process for an IP address corresponding to the WAN interface corresponding to an appropriate relay path is performed with the L2TP session ID being used as a key. In other words, whereas a socket bind process for the transmission-source IP address is performed in an IP routing process at the stage next to the IP masquerade process, the transmission-source IP address is determined according to relay path information included in the session management table (312) in the source address binding process itself.

The socket bind process here means that the transmission source apparatus (client) binds the destination IP address and the upper protocol (such as a port number) to a socket process to allow an upper application to send packets, and the transmission destination apparatus (server) binds the own IP address and the upper protocol (such as a port number) to a socket process to allow the upper application to receive the packets. Here, it indicates a process (source bind process) in which the upper application explicitly binds the IP address given to the network interface as a source address to the socket process.

The IP routing processor (311) outputs a packet to an access line (809). The packet is sent by using the session (L2TP tunnel) corresponding to the session ID. Because a data transfer process from the WAN line to the LAN line is performed according to a usual IP routing process, a description thereof is omitted.

Figure 12:
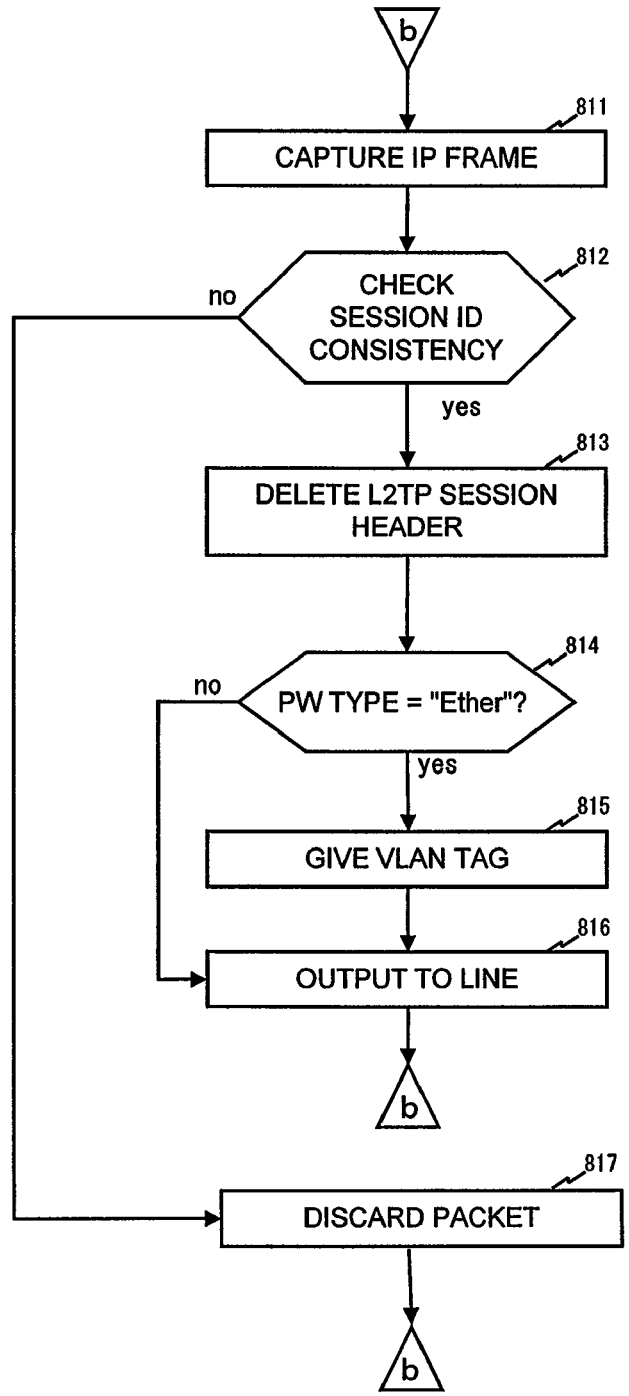
FIG. 12 is a diagram showing a transfer process sequence of the L2TP server used in the present invention.
Figure 13:
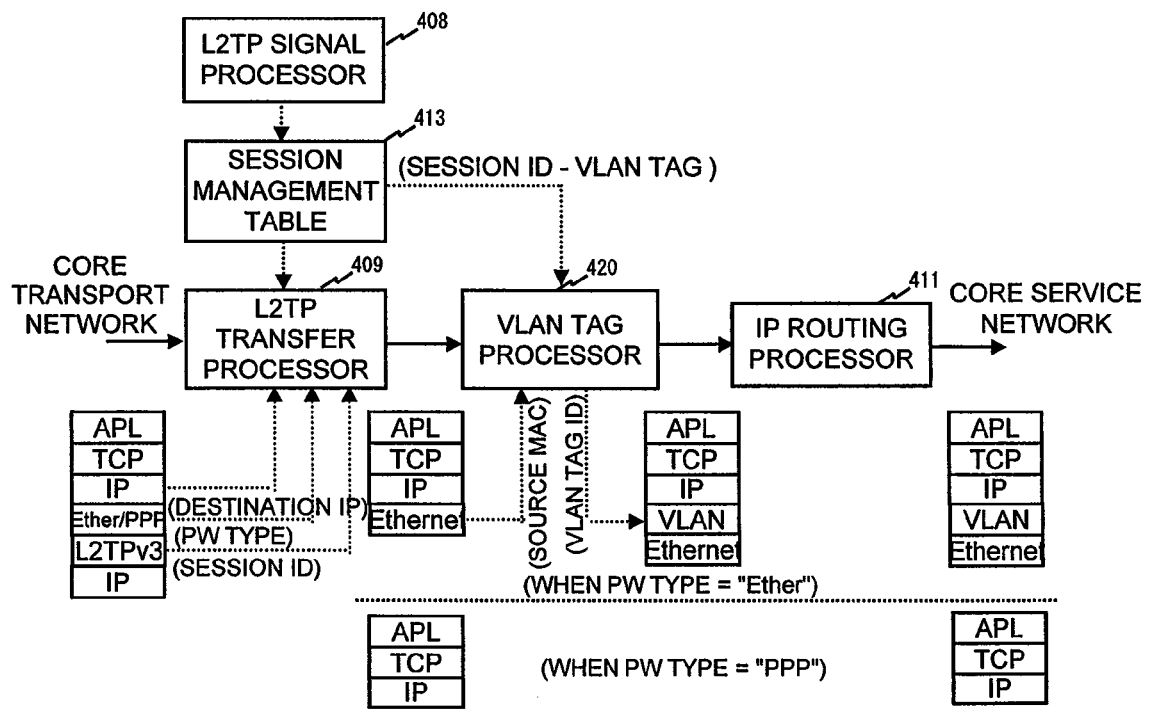
FIG. 13 is a diagram showing an upstream transfer process of the L2TP server used in the present invention.

FIG. 12 is a flowchart of a packet transfer process in the L2TP server (105). FIG. 13 is a diagram showing a data packet transfer process from the core transport network (210) to the core service network (211) in the L2TP server (105). The difference with FIG. 11 is that the VLAN tag processor (420) is used instead of the source IP address bind processor (310). The VLAN tag process includes a process performed by a transmission source apparatus (client or L2TP server 105) to generate a VLAN tag and insert it between an L2 frame of Ethernet (registered trademark) or the like and an IP frame, and a process performed by a transmission destination apparatus (server 106) to remove the VLAN tag inserted between the L2 frame of Ethernet (registered trademark) or the like and the IP frame.

Prior to data transfer, the L2TP signal processor (408) executes the processes shown in FIG. 8 in advance to generate the session management table (413), shown in FIG. 7. In the L2TP server (105), the L2TP transfer processor (409) captures an IP frame (811) in the data frame input from the core transport network (210). Then, the L2TP server (105) searches the session management table (413) with the PW type, destination IP address, and session ID extracted from the captured IP frame being used as keys to check the consistency of the L2TP header by whether a corresponding entry exists (812). When the consistency was confirmed (812), the L2TP transfer processor (409) deletes the L2TP session header (813). If the consistency was not confirmed (812), the L2TP transfer processor (409) discards the received packet (817).

After the process 813, the L2TP server (105) refers to the PW (virtual wire) type. When the PW type is "Ether" (814), the VLAN tag processor (420) gives a VLAN tag (815). If the PW type is not "Ether" (814), giving a VLAN tag is skipped. Finally, the L2TP server (105) uses the IP routing processor (411) to output the packet (816) to the server (106) located at the core service network (211).

Because the same process needs to be performed when data is transferred from the core service network to the core transport network (direction reverse to that described above), a description for this case will be omitted.

As described above, so-called multi-routing processing can be realized in which the L2TP session tables (313 and 413) are used to make the MAC address of the LAN terminal (103 or 104) and the IP address of the server (106) a pair of keys and a desired relay path is selected among a plurality of relay path with the pair of keys. It is also possible to have a setting where the MAC addresses of the LAN terminals (103 and 104) and the types (fixed terminal and mobile terminal) of the LAN terminals are associated with each other in advance to guarantee, for example, that the mobile terminal M (104) accesses the server through the mobile ISP and the fixed terminal F (103) accesses the server through the fixed ISP. In addition, to download a large-capacity file, it is also possible to have a setting that provides the mobile terminal M (104) with a server access through the fixed ISP. Since the session management tables (313 and 413) can be specified to make the relay path selection logic flexible, an optimum FMC service is provided for each terminal in each application.

With the processes described above, the CE router A (101) can send the IP address of a server that provides an FMC service, to the LAN terminals controlled by the CE router A (101), and at the same time, the CE router A (101) can appropriately select communication paths between the LAN terminals and the service network.

The CE router A (101) may acquire in advance the address of the server (106) associated with a VPN identifier (session ID) from the L2TP server (105) by using VPN Protocol and send the address of the server (106) to the terminals in advance. Alternatively, the CE router A (101) may acquire in advance the address of the server (106) associated with a VPN identifier from the L2TP server (105) by using VPN Protocol and send the address of the server (106) to a terminal (103 or 104) that sends an address solution request for the server (106).

The CE router A (101) may acquire the address of the server (106-F) that provides a fixed-terminal service from the L2TP server (105) by using VPN Protocol and then, send the address of the server for the fixed terminal, to the mobile terminal M (104). In addition, the CE router A (101) may acquire the address of the server (106-M) that provides a mobile-terminal service from the L2TP server (105) by using VPN Protocol and then, send the address of the server for the mobile terminal, to the fixed terminal F (103).

3. Example Relay Paths

Appropriate paths can be used between the CE router A (101) and the server (106), in addition to the first path to the fourth path, described above. Example relay paths will be shown below.

A fifth path is a path (F-F-M) from the fixed terminal F (103) through the fixed ISP network (207) to the second address (106-M) of the server (106). For example, the fixed terminal F (103) connects the server (106-M) through the CE router A (101), the GW router F (206), and the L2TP server (105).

A sixth path is a path (F-M-F) from the fixed terminal F (103) through the mobile ISP network (209) to the first address (106-F) of the server (106). For example, the fixed terminal F (103) connects the server (106-F) through the CE router A (101), the GW router M (208), and the L2TP server (105).

A seventh path is a path (M-M-F) from the mobile terminal M (104) through the mobile ISP network (209) to the first address (106-F) of the server (106). For example, the mobile terminal M (104) connects the server (106-F) through the CE router A (101), the GW router M (208), and the L2TP server (105).

An eighth path is a path (M-F-M) from the GW router (208) through the fixed ISP network (207) to the second address (106-M) of the server (106). For example, the mobile terminal M (104) connects the server (106-M) through the CE router A (101), the GW router F (206), and the L2TP server (105).

These paths can be stored in the session management table (313) of the CE router A (101) and the session management table (413) of the L2TP server (105), described above.

4. Embodiment without L2TP Server

FIG. 14 is a diagram showing the structure of a communication system that does not use L2TP-VPN. In the figure, a mobile terminal is not accommodated by a home LAN.

In FIG. 14, a mobile terminal M (203) located in a Cell B (202) connects to a server M (208) through an AP router B (102) of a wireless access network (200) and a GW router M (208) of a mobile ISP network (209). When the mobile terminal M (203) moves into a LAN A (201), the mobile terminal M (203) connects to a server F (107), for example, through a CE router A (1101) and a GW router F (206) of a fixed ISP network (207).

FIG. 15 is a diagram showing the structure of an FMC communication system that does not use L2TP-VPN. In the figure, a mobile terminal is accommodated by a home LAN.

The FMC communication system shown in FIG. 15 includes, for example, a LAN A (201) to which a CE router A (1101) belongs, a fixed access network (100), a fixed ISP network (207), a mobile ISP network (209), a core transport network (210), and a core service network (211). The communication system is provided, for example, with the CE (customer edge) router A (1101), a server (107) installed in the core service network (211) and providing a service for a fixed terminal F (103), and a server (108) providing a service for a mobile terminal M (104). The CE (customer edge) router A (1101) is connected, for example, to the fixed terminal F (103) connected to the LAN A (201) and to the mobile terminal M (104) connected to the LAN A (201). The fixed ISP network (207) is provided with a GW router F (206), and the mobile ISP network (209) is provided with a GW router M (208).

The CE router A (1101) and the GW router F (206) installed in the fixed ISP network (207) are connected, for example, by a PPPoE tunnel (204). The CE router A (1101) and the GW router M (208) installed in the mobile ISP network (209) are connected, for example, by an IPsec tunnel (205). The fixed ISP network (207), the mobile ISP network (209), the core transport network (210), and the core service network (211) are connected by Internet Protocol.

In the FMC communication system shown in FIG. 15, where an L2TP server does not exist, FMC services are realized when the CE router A (1101) explicitly associates paths with services to be used between the CE router A (1101) and the servers (107 and 108) in advance.

FIG. 16 shows an example structure of a session management table (1313) of the CE router A (1101).

When an L2TP server is not used, as in the present embodiment, a routing table ID is used, for example, instead of the L2TP session ID used in the above-described embodiment. The routing table ID is the ID of a routing table among a plurality of routing tables. For example, Linux can have a plurality of routing tables, but actually, only one routing table is selected and used.

The session management table (1313) includes a source MAC address field for storing the MAC address of the terminal (103 or 104) managed by the CE router A (1101); a destination server IP address field for storing an IP address of a server that the terminal (103 or 104) accesses; a relay path PW type field for indicating a relay path; and a routing table ID field. The relay path PW type is set to "Ether", for example, when the mobile ISP network is used, and the PW type is set to "PPP" when the fixed ISP network is used. In addition to these settings, appropriate identification information indicating that the mobile ISP network is used and the fixed ISP network is used. These pieces of information are determined by provisioning. Paths corresponding to the first to eighth paths, described above, can be used between the terminals (103 and 104) to the servers (107 and 108).

Figure 17:
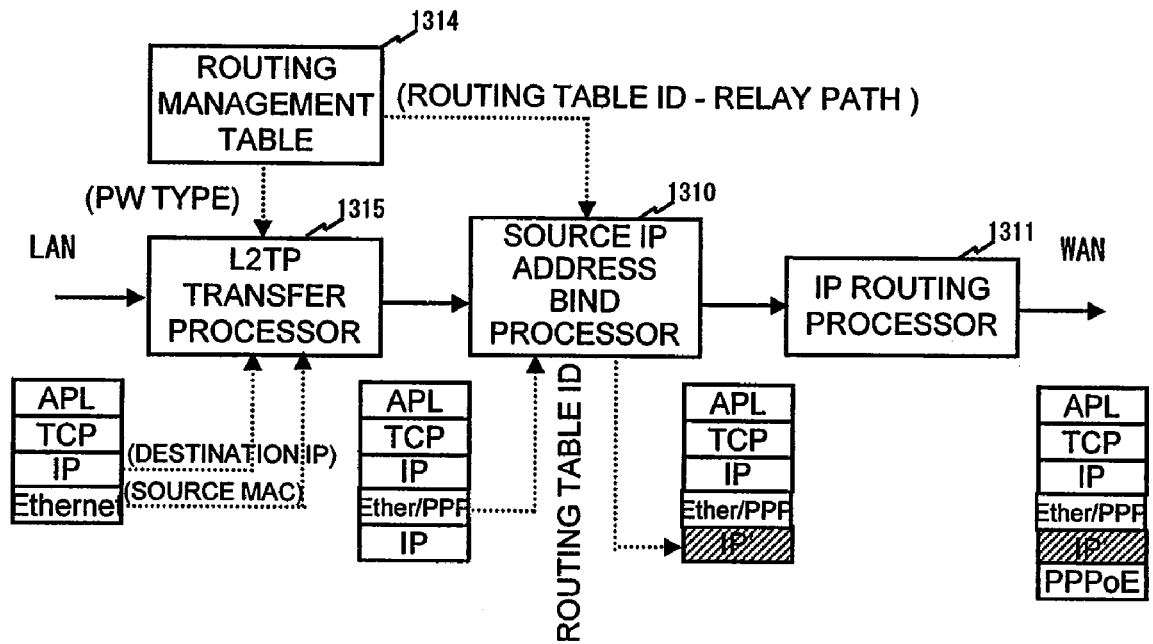
FIG. 17 is a diagram showing a transfer process of a data packet from a LAN line to a WAN line in the CE router.

FIG. 17 is a diagram showing a data packet transfer process from a LAN line to a WAN line in the CE router A (1101).

Prior to data transfer, the session management table (1313), shown in FIG. 16, is generated in advance. In the CE router A (1101), an L2 transfer processor (1315) captures an Ether frame in the data frame input from the LAN A (201). Then, the L2 transfer processor (1315) searches the session management table (1313) with the source MAC address and destination IP address extracted from the captured Ether frame as keys. When the source MAC address and destination IP address are found, a corresponding session ID and PW type are acquired. The PW type is given to the captured Ether frame. A source IP address binding processor (310) determines a source IP address. For example, the routing table corresponding to an acquired routing table ID is referenced. A plurality of routing tables are provided in association with routing table IDs. For example, the tables corresponding to routing table IDs 1, 3, and 4 are configured such that a packet is sent to the server (107 or 108) through the GW router F (206). In another example, the table corresponding to a routing table ID 2 is configured such that a packet is sent to the server (107 or 108) through the GW router M (208).

Then, an IP routing processor (1311) outputs the packet to the access line. The packet is sent through either the GW router F (206) or the GW router M (208) according to the routing table ID. Because a data transfer process from the WAN line to the LAN line is performed according to a usual IP routing process, a description thereof is omitted.

INDUSTRIAL APPLICABILITY

The present invention can be used, for example, in FMC systems. The present invention can be used in a network system in which a fixed-terminal network service and a mobile-terminal network service are configured with a plurality of relay networks by using Internet Protocol, for example.

The invention claimed is:

1. A relay network system comprising:
   a terminal adaptor apparatus that has a management table where a transmission-source address of a packet, destination information indicating a destination address or a destination domain name of the packet, and relay path information indicating either through a fixed network or through a mobile network are stored in advance in association with each other, and that relays packets sent from a fixed terminal and a mobile terminal to the fixed network and the mobile network; and
   a termination network apparatus that accommodates a server for providing services for the fixed terminal and the mobile terminal, and that terminates a session through the fixed network and a session through the mobile network with the terminal adaptor apparatus;
   wherein the terminal adaptor apparatus
   receives session establishment request which includes a transmission source address and destination information indicating the server, from either the fixed terminal or the mobile terminal;
   refers to the management table according to the transmission source address and the destination information to acquire corresponding relay path information;

establishes session with the termination network apparatus through the fixed network or the mobile network according to the acquired relay path information;

stores session identifier for identifying the session in the management table in association with the transmission source address and the destination information of the session establishment request;

when receiving packet that includes transmission source address and destination information, from the fixed terminal or the mobile terminal, refers to the management table to acquire the session identifier corresponding to the transmission source address and the destination information; and relays the packet to the termination network apparatus by using the session through either the fixed network or the mobile network according to the acquired session identifier.

2. A relay network system according to claim 1, wherein the session is a virtual closed-network session.

3. A relay network system according to claim 2, wherein the virtual closed-network session is a session specified by Layer-2 Tunneling Protocol.

4. A relay network system according to claim 1, wherein, in the management table, a MAC address of the fixed terminal or the mobile terminal is stored as the transmission source address, an IP address or a domain name of the server is stored as the destination information, and data type information of a capsulated frame is stored as the relay path information.

5. A relay network system according to claim 1,
wherein the management table stores in advance
first path information that includes a transmission source address of a first fixed terminal, first destination information used by the server to provide a first service, and relay path information indicating through the fixed network,
second path information that includes a transmission source address of a second fixed terminal, second destination information used by the server to provide a second service, and relay path information indicating through the mobile network,
third path information that includes a transmission source address of a first mobile terminal, the second destination information used by the server, and the relay path information indicating through the mobile network, and
fourth path information that includes a transmission source address of a second mobile terminal, the first destination information used by the server, and the relay path information indicating through the fixed network.

6. A relay network system according to claim 1,
wherein the termination network apparatus
has a second management table that stores in advance a virtual network identifier for identifying a virtual network with the server, in association with a session identifier with the terminal adaptor apparatus,
receives a packet that includes a session identifier from the terminal adaptor apparatus,
refers to the second management table according to the session identifier included in the received packet to convert the session identifier of the packet to a corresponding virtual network identifier,
relays the packet through a virtual network corresponding to the virtual network identifier to the server.

7. A relay network system according to claim 1, wherein the termination network apparatus accommodates the server, which provides a first service for the fixed terminal and the mobile terminal through a first virtual network and provides a second service for the fixed terminal and the mobile terminal through a second virtual network.

8. A relay network system according to claim 1,
wherein the termination network apparatus accommodates
a first server that provides a first service for the fixed terminal and the mobile terminal through a first virtual network, and
a second server that provides a second service for the fixed terminal and the mobile terminal through a second virtual network.

9. A relay network system according to claim 1,
wherein the termination network apparatus stores an address of the server in advance, and
the terminal adaptor apparatus acquires the address of the server in advance through a virtual closed network from the termination network apparatus and sends the address of the server in advance to the fixed terminal or the mobile terminal.

10. A relay network system according to claim 9,
wherein the terminal adaptor apparatus
stores the acquired address of the server in association with a session identifier, and
when receiving a packet that includes a transmission source address and the address of the server from the fixed terminal or the mobile terminal, capsulates the received packet by using a header that includes the corresponding session identifier to relay the packet.

11. A relay network system according to claim 9, wherein, when receiving an address solution request for the server from the fixed terminal or the mobile terminal, the terminal adaptor apparatus sends the acquired address of the server to the fixed terminal or the mobile terminal.

12. A relay network system according to claim 9,
wherein the terminal adaptor apparatus
acquires an address of a first server that provides a service for the fixed terminal, from the termination network apparatus, and
sends the address of the first server to the mobile terminal.

13. A relay network system according to claim 9,
wherein the terminal adaptor apparatus
acquires an address of a second server that provides a service for the mobile terminal, from the termination network apparatus, and
sends the address of the second server to the fixed terminal.

14. A terminal adaptor apparatus comprising:
a management table where a transmission-source address of a packet, destination information indicating a destination address or a destination domain name of the packet, and relay path information indicating either through a fixed network or through a mobile network are stored in advance in association with each other;
a signal processor that establishes a session through the fixed network and a session through the mobile network with a termination network apparatus that accommodates a server for providing services for a fixed terminal and a mobile terminal and terminates the sessions; and
a transfer processor that relays packets sent from the fixed terminal and the mobile terminal to the fixed network and the mobile network;
wherein the signal processor
receives session establishment request which includes a transmission source address and destination information indicating the server, from either the fixed terminal or the mobile terminal;
refers to the management table according to the transmission source address and the destination information to acquire corresponding relay path information;

establishes session with the termination network apparatus through the fixed network or the mobile network according to the acquired relay path information;

stores session identifier for identifying the session in the management table in association with the transmission source address and the destination information of the session establishment request; and the transfer processor, when receiving packet that includes transmission source address and destination information, from the fixed terminal or the mobile terminal, refers to the management table to acquire the session identifier corresponding to the transmission source address and the destination information; and relays the packet to the termination network apparatus by using the session through either the fixed network or the mobile network according to the acquired session identifier.

* * * * *